Figure 33:
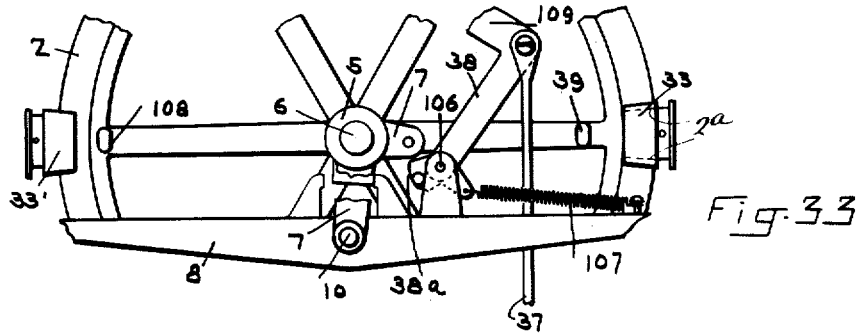

F. K. FASSETT.
DOOR OPERATING MECHANISM.
APPLICATION FILED AUG. 16, 1911.
1,174,403.
Patented Mar. 7, 1916.
12 SHEETS—SHEET 1.
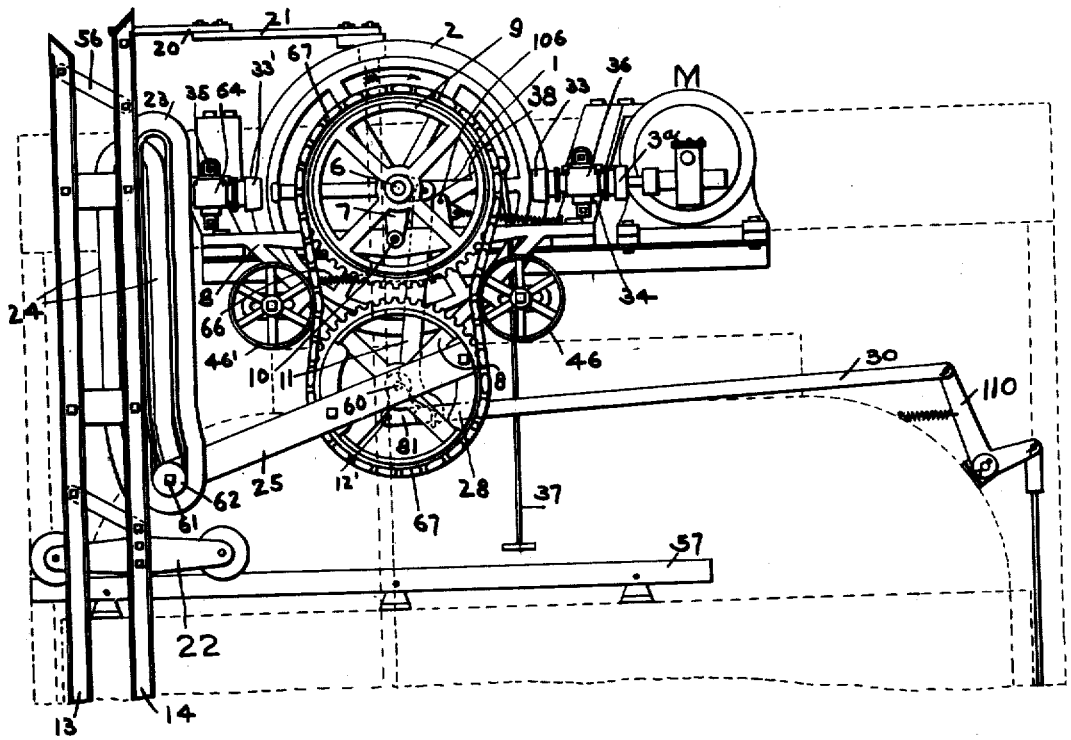
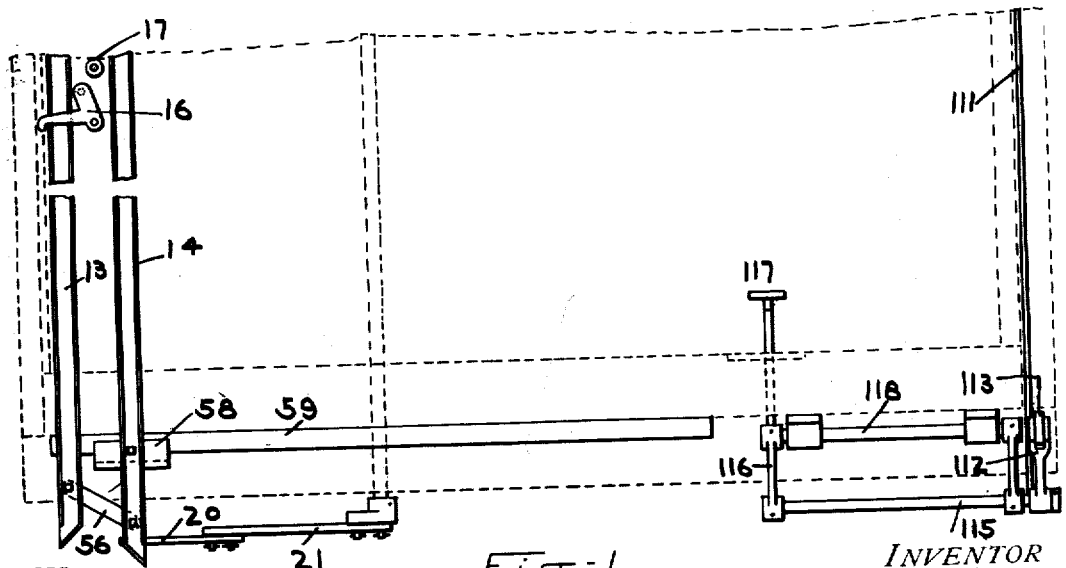
Fig-1
WITNESSES:
Geo. S. Wheelock
A. Bernstein
INVENTOR
Francis K. Fassett
BY Newell & Neal
Attorney

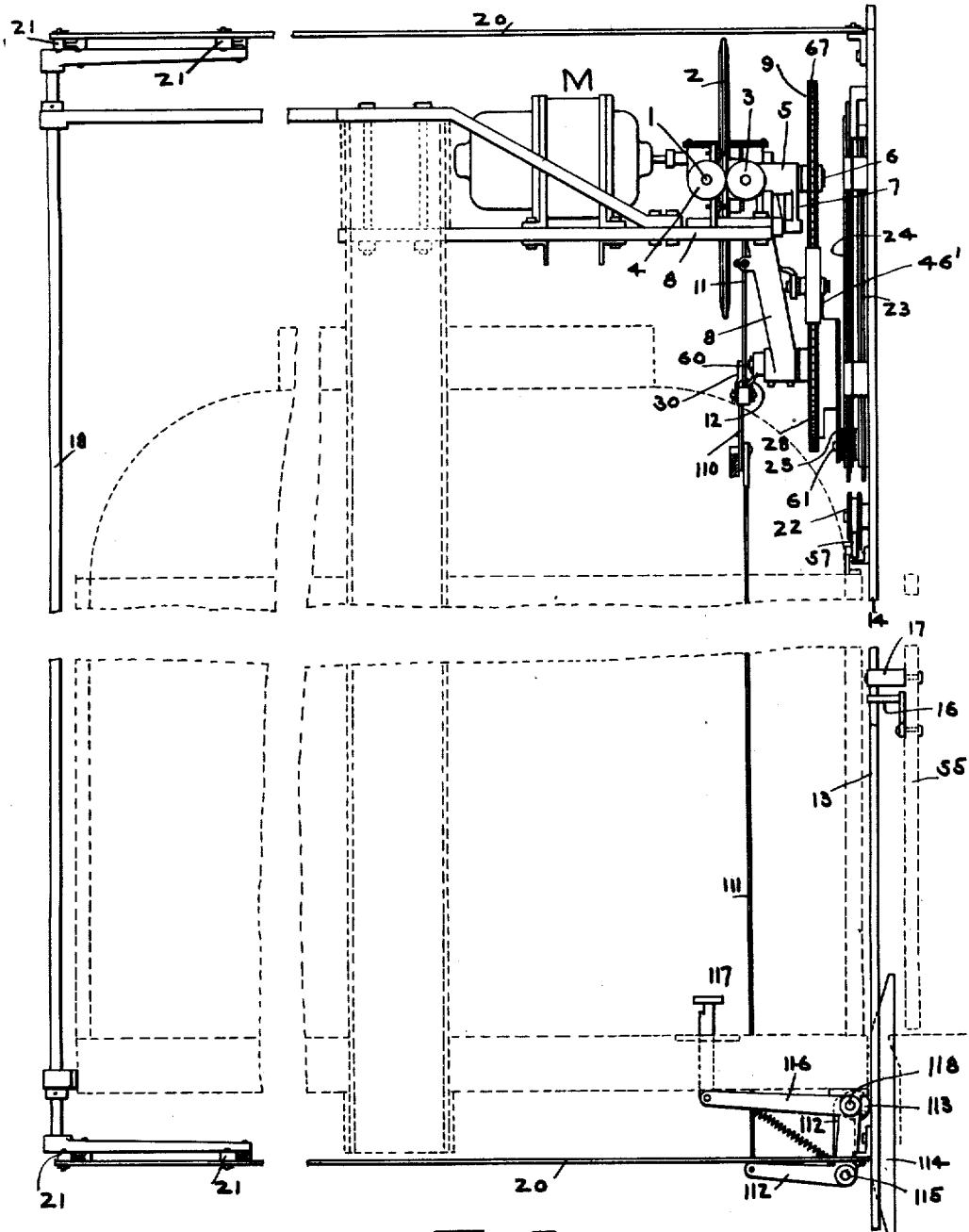

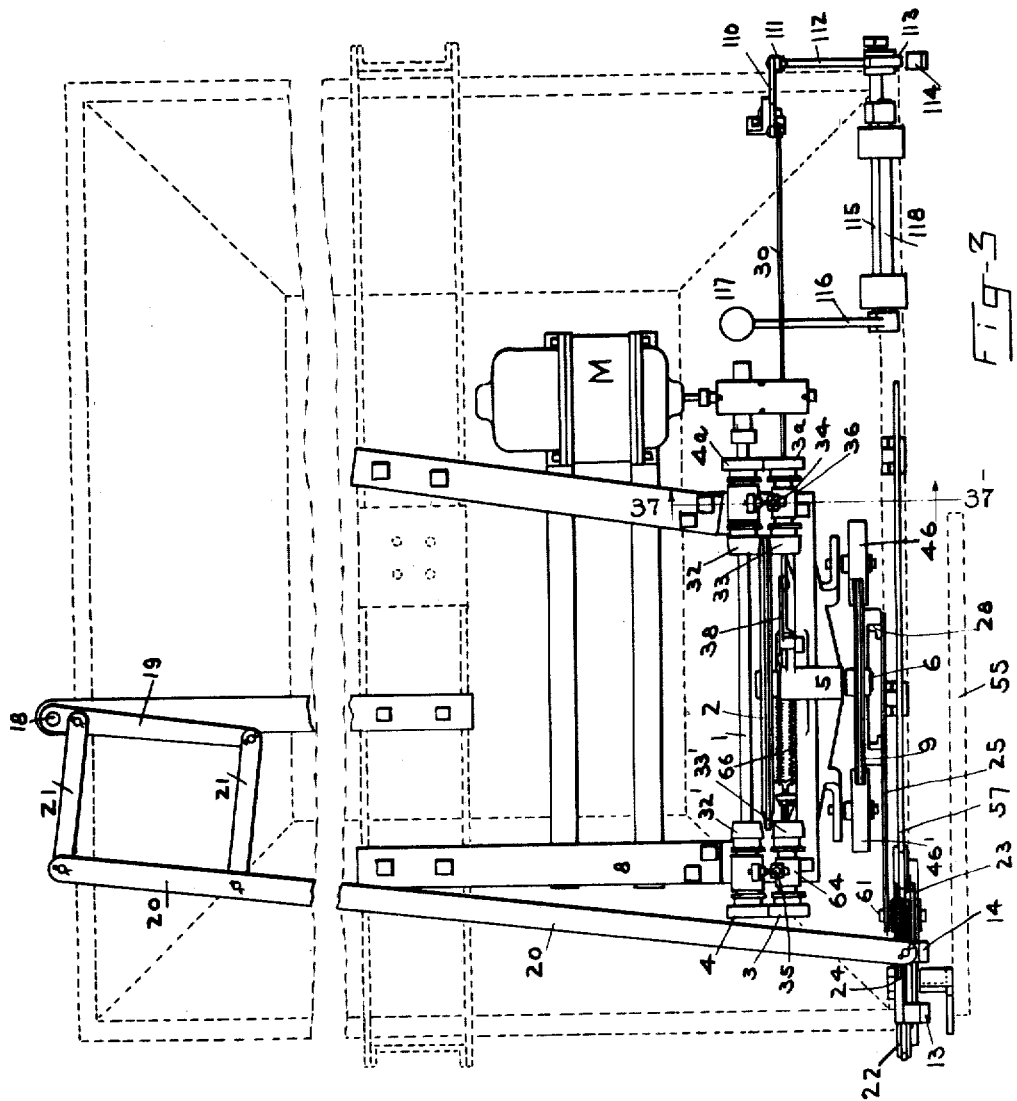

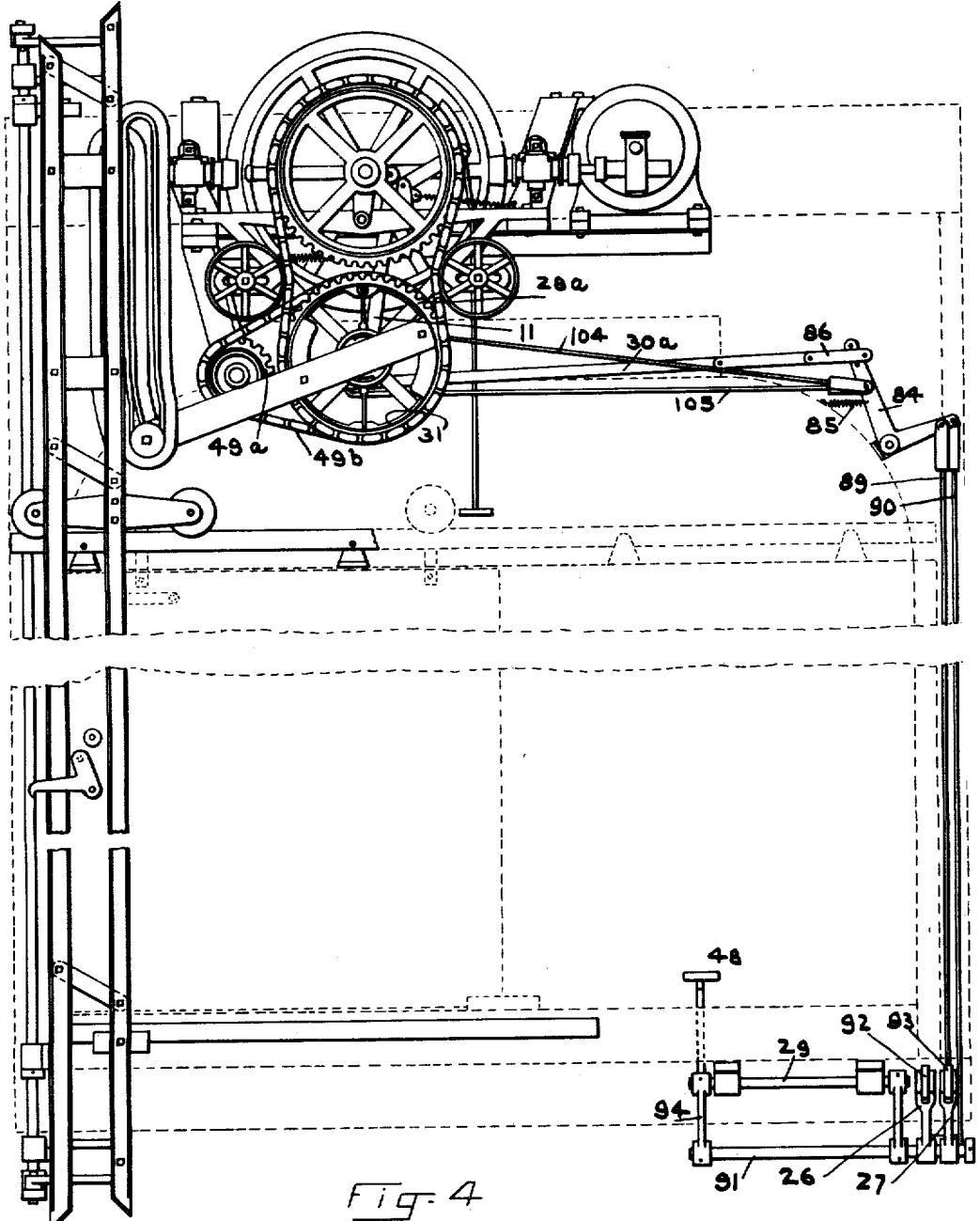

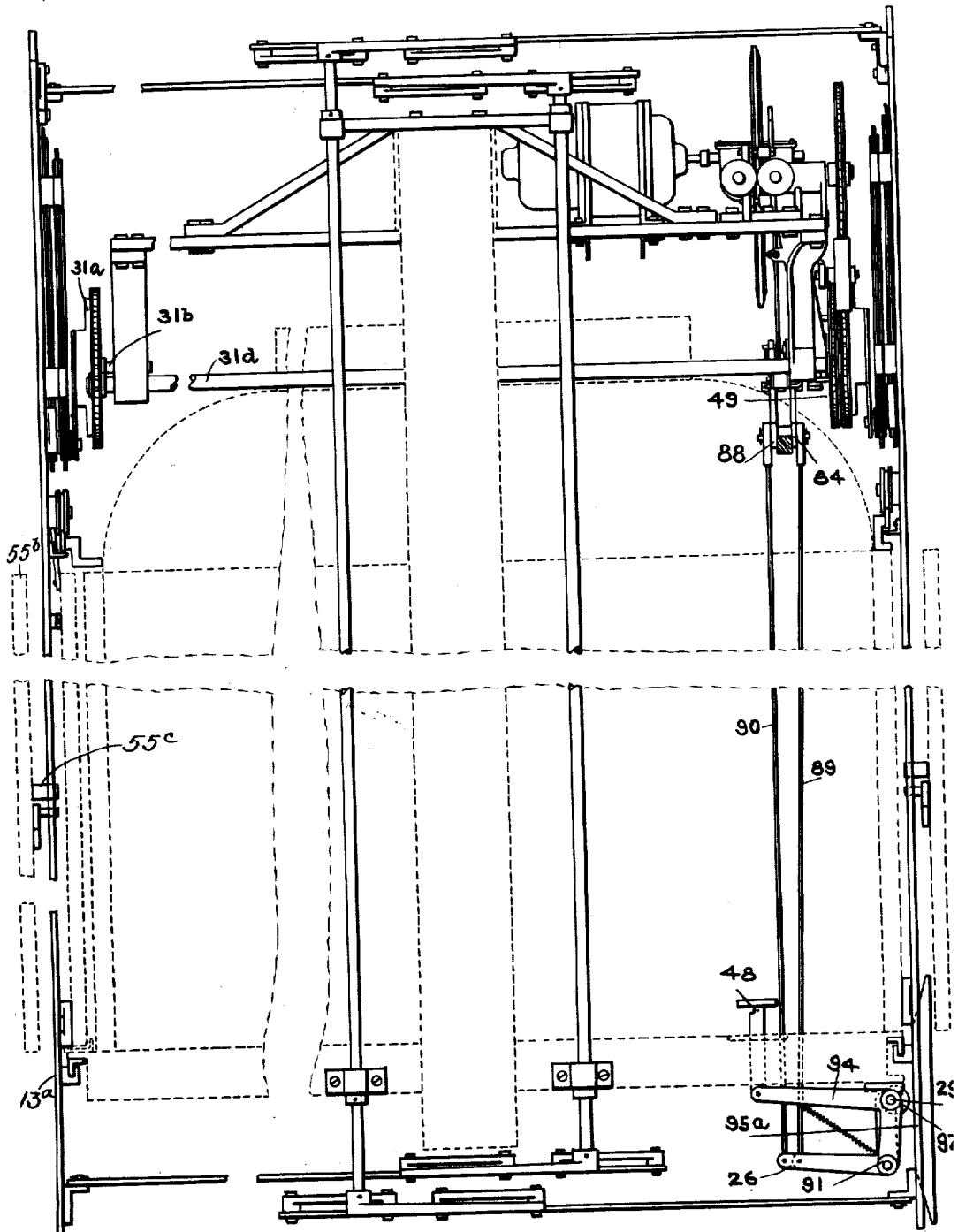

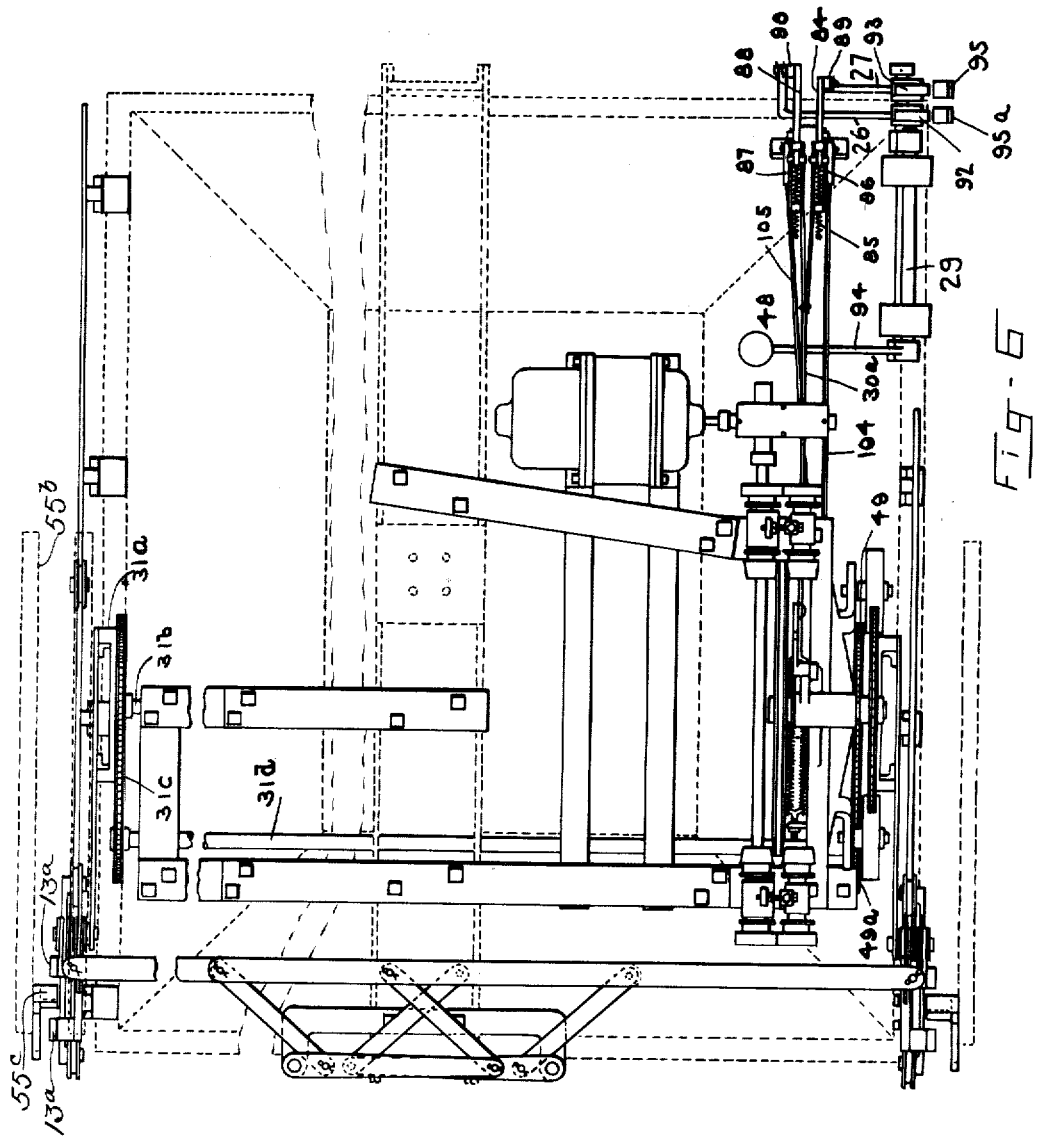

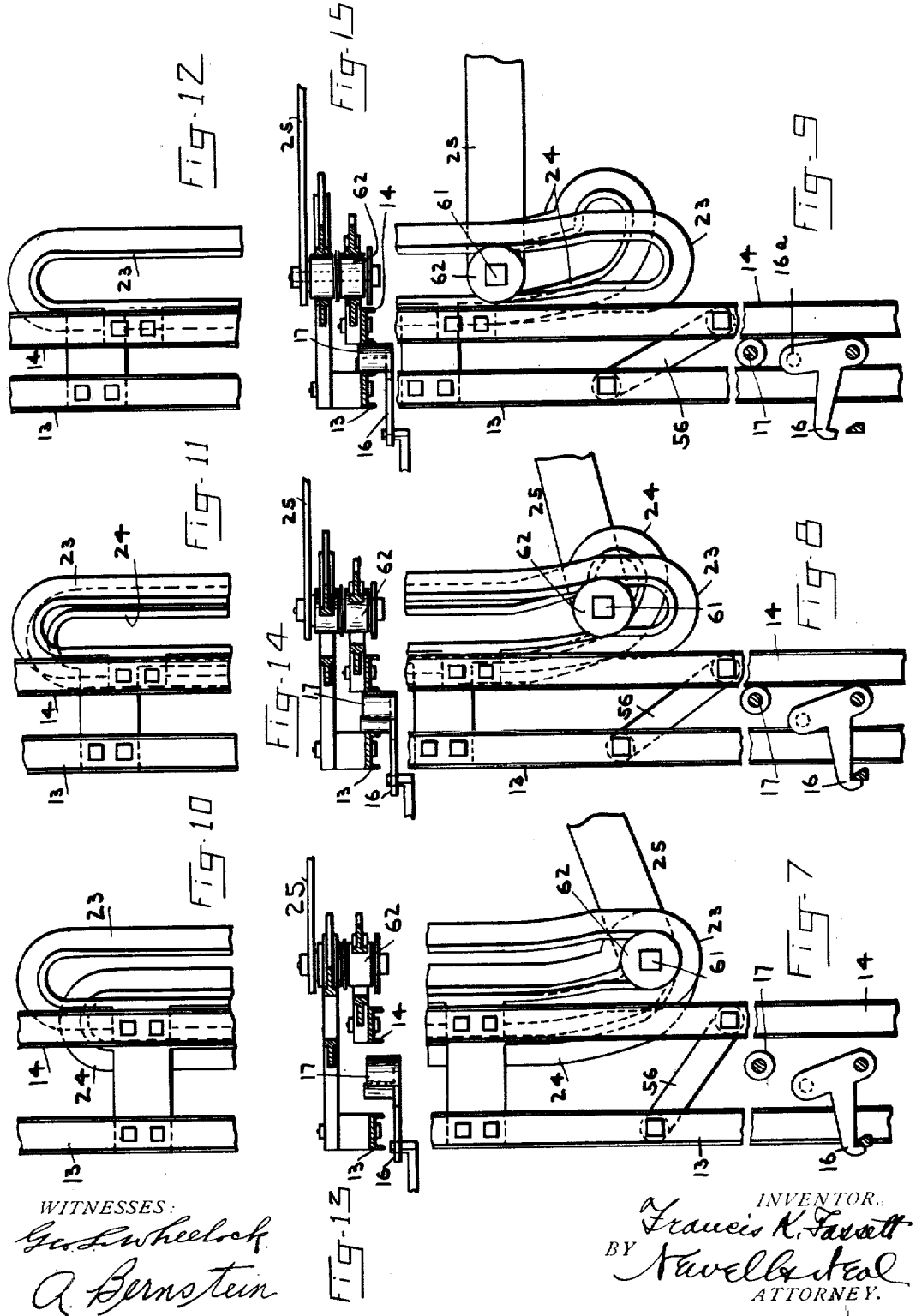

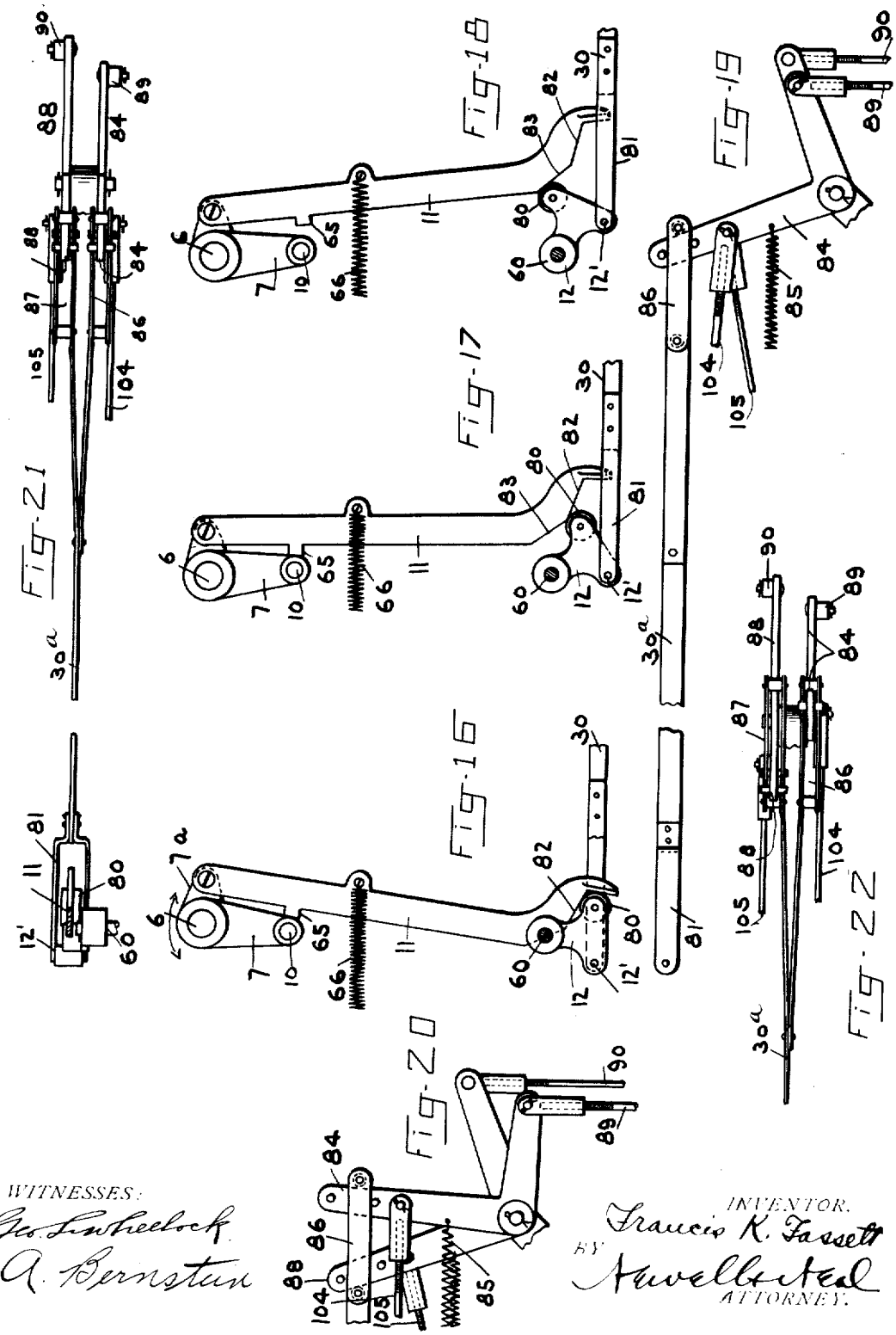

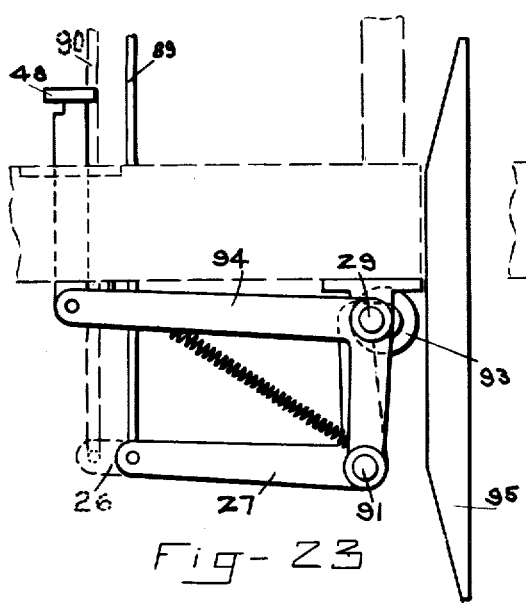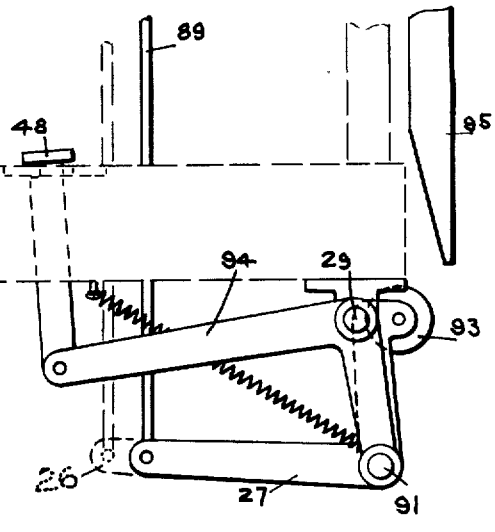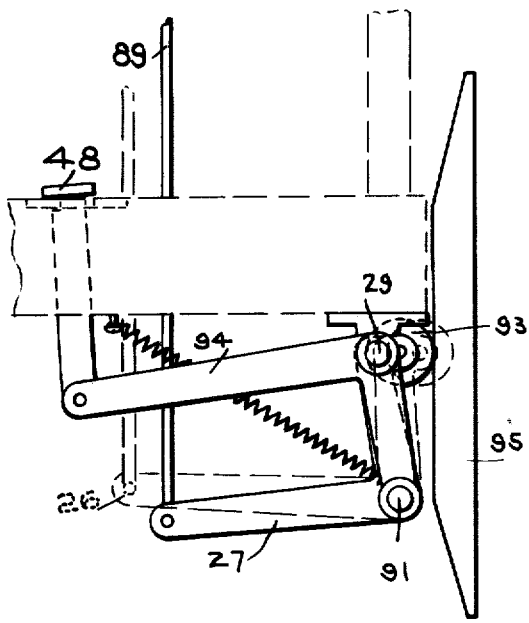

F. K. FASSETT.
DOOR OPERATING MECHANISM.
APPLICATION FILED AUG. 16, 1911.
1,174,403. Patented Mar. 7, 1916.
12 SHEETS—SHEET 10.
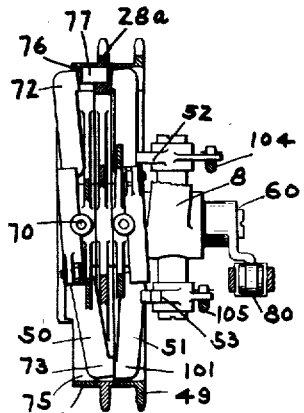
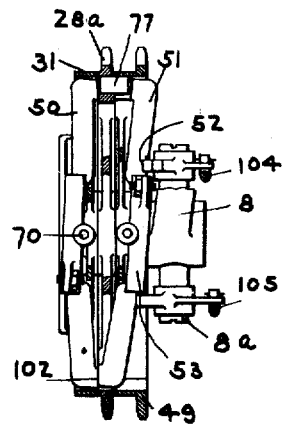
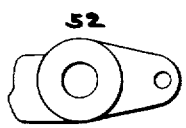
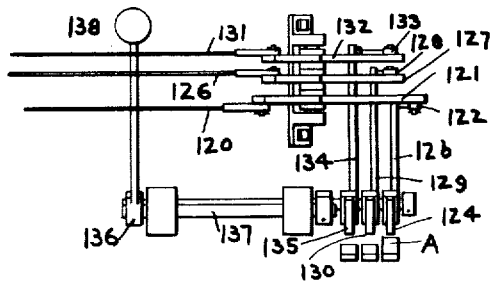
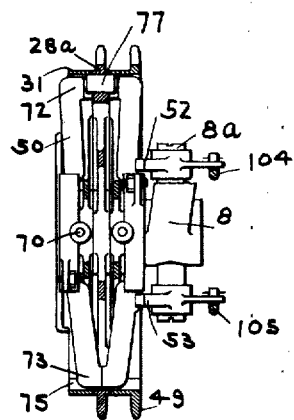
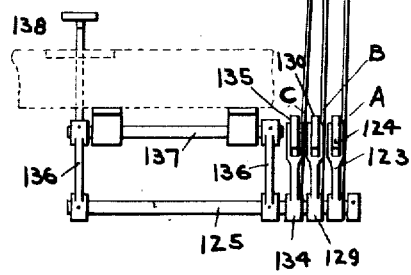
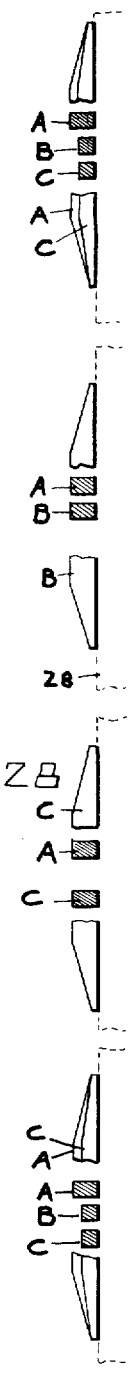
WITNESSES:
Geo. L. Wheelock
A. Bernstein
INVENTOR.
Francis K. Fassett
BY Newell K. Neal
ATTORNEY.

F. K. FASSETT.
DOOR OPERATING MECHANISM.
APPLICATION FILED AUG. 16, 1911.

1,174,403.

Patented Mar. 7, 1916.
12 SHEETS—SHEET 11.

WITNESSES:
Geo. L. Wheelock
A. Bernstein

INVENTOR.
Francis K Fassett
BY Newell & Co
ATTORNEY.

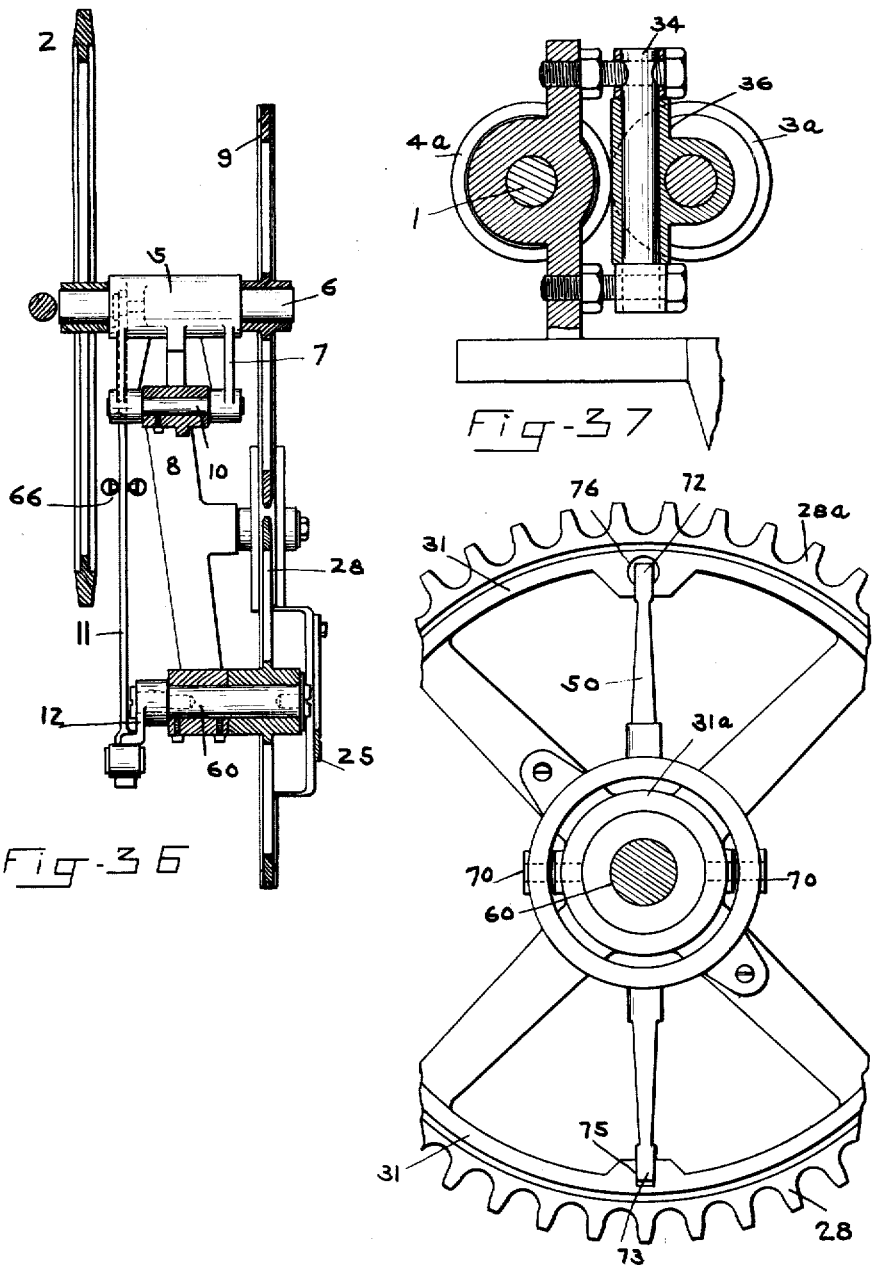

UNITED STATES PATENT OFFICE.

FRANCIS K. FASSETT, OF DAYTON, OHIO, ASSIGNOR TO ELEVATOR SUPPLY & REPAIR COMPANY, A CORPORATION OF ILLINOIS.

DOOR-OPERATING MECHANISM.

1,174,403.  Specification of Letters Patent.  Patented Mar. 7, 1916.

Application filed August 16, 1911. Serial No. 644,305.

*To all whom it may concern:*

Be it known that I, FRANCIS K. FASSETT, a citizen of the United States, residing at Dayton, Ohio, have invented certain new and useful Improvements in Door-Operating Mechanism, of which the following is a clear, full, and exact description.

This invention relates to door-operating mechanisms and more particularly to those designed for operating the doors of passenger carriers such as elevators, railway cars, etc.

A general object of the invention is to provide an automatic door-operating mechanism which will be more simple and inexpensive in construction than mechanisms heretofore employed, and which will be more certain and safe in operation.

Another object of the invention is to provide an automatic door-operating mechanism which may be controlled to operate selectively any one of a plurality of doors and which, preferably, may also be controlled to operate a plurality of doors simultaneously.

Among the more particular objects of the present invention are the following: To provide an improved transmitter for communicating motion from a suitable source of power to the door or doors to be operated, said transmitter preferably comprising means for causing the engagement and operation of the latch of a landing door to unlock the same and to open the door, and also to close the door and then lock it. Further to provide contractile means to coöperate with the latching means to unlock or lock a door, said contractile means acting to open or close said door when suitably operated. Further to provide a connecting lever adapted to be rocked more than 180°, the excess rock being utilized to unlock or lock the door. Further to provide parallels for making a connection between the movable car and a landing door, and which are arranged to be normally separated so that the car can be moved past the landing doors without the parallels touching coöperating parts on the door and so that the said parallels can be closed together when they are to operate a door. Further to provide means for unlocking and locking the lock of a landing door which coöperates with keeper means at the door jamb, together with a motor device carried by the car for the purpose of operating the door. Further to provide in connection with a manually operated device for controlling the transmitter, means for equalizing the pressure on said manually operated device. Further to provide improved means for manual control in connection with deflectors at the landings. Further to provide improved means for disabling the transmitter when the door or doors are to be operated manually. Further to provide a single power transmitter for selectively operating doors on different sides of a car. Further to provide clutch mechanism for coöperation with such selective means.

Further objects are to provide an efficient and practical door operating means for operating the doors of elevator cars, parts of which are applicable to the operation of doors on opposite sides of a railway car.

These being among the objects of the present invention, the same consists of certain features of construction and combinations of parts to be hereinafter described and then claimed with reference to the accompanying drawings illustrating suitable embodiments of the invention, and in which—

Figure 34:
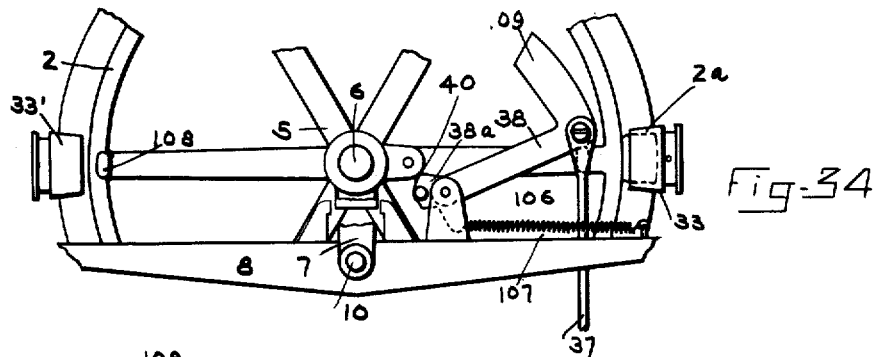
Figure 35:
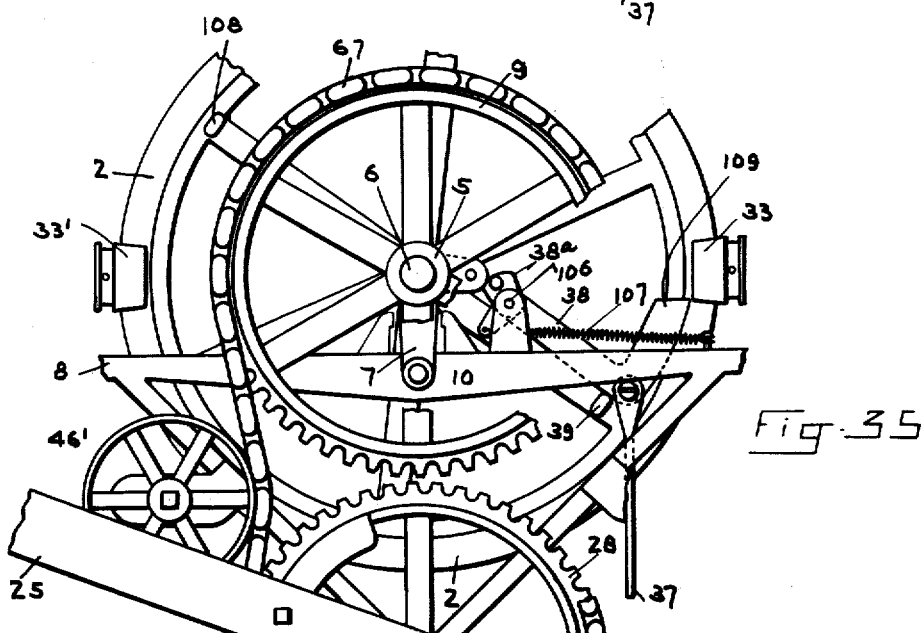

Figure 1 is a front view of an elevator car in dotted lines equipped with the present improvements and with doors on one side only of the elevator shaft, parts being broken away; Fig. 2 is a side view of the same parts, and Fig. 3 is a plan view; Fig. 4 is a view similar to Fig. 1 of a car having mechanism arranged to operate doors on opposite sides; Fig. 5 is a side view thereof, and Fig. 6 is a plan. In Figs. 4, 5 and 6 there is shown in dotted lines a door carried by the car and operated simultaneously with the landing doors. Figs. 7, 8 and 9 are front elevations showing portions of the parallels, the connecting lever and concomitant parts illustrating the manner of operating a door latch and securing the contracted position of the parallels in opening and closing a door; Figs. 10, 11 and 12 are views illustrating the upper portions of the parallels shown in Figs. 7, 8 and 9; Figs. 13, 14 and 15 are end views of the parts shown in Figs. 7, 8 and 9; Figs. 16, 17 and 18 are detail front views showing three positions of the "spring lever" as it is actuated by the means for equalizing the manually operated device; Figs. 19 and 20 are views illustrating the connecting links of the equalizing means, respectively, without and with the manually operated device pressed, the car being at a landing; Fig. 21 is a plan view of the parts shown in Fig. 19 in the same position, and Fig. 22 is a plan view of the parts shown in the position of Fig. 20; Figs. 23, 24 and 25 are detail side views of the manually operated device and the associated parts in connection with the deflector at a landing, said views showing different positions; Figs. 26 and 27 show the arrangement of the manually operated device and connections, when at some of the landings doors must be opened on both sides simultaneously; Fig. 28 is a view illustrating the succession of deflectors in the elevator shaft, each group of deflectors being broken away to make room for transverse sections of such group; Figs. 29, 30 and 31 are detail sectional views of the clutch mechanism showing three positions; Fig. 29 the position required when a primary door is to be operated; Fig. 30 the position required for operating a secondary door, and Fig. 31 the position required when both doors are to be operated. Fig. 32 is a detail view of the clutch-operating cam; Figs. 33, 34, 35 are detail front views of portions of the power transmitter, showing the action of the disabling means; Fig. 33 showing the normal position of the disabling lever; Fig. 34 showing how the lever cams the rock arm into a vertical position, thereby disengaging the friction wheel from both pair of friction cones, and Fig. 35 showing how the disabling lever engages the lug on the friction wheel and rotates the wheel far enough to leave the connecting lever above the center so that a door may be opened by hand. Fig. 36 is a transverse section through the transmitter principally for the purpose of showing the manner of attaching various parts thereto; Fig. 37 is a section on the line 37—37, Fig. 3 to show the manner of mounting and adjusting the secondary cones, and Fig. 38 is a detail view of the secondary sprocket showing the manner of mounting the clutch yoke.

It will be obvious throughout this explanation that the mechanism may be carried by the car or not, but it is particularly designed and adapted to be carried by the car. The car which is indicated by dotted outlines is moved in the shaft, not shown. Only those parts are shown which are necessary to a full understanding of the present invention.

Referring to Figs. 1, 2 and 3, there is indicated at a floor a horizontally slidable door 55 which carries a latch 16 suitably mounted on the door. When the car is at or near the floor at which a door is to be operated, the operator may press upon the foot-button 117 shown as 48 in the modification in Figs. 23, 24 and 25, and the door will open automatically. On the release of the foot-button the door will close. The door 55 carries a stud or roller 17 which is fixed to the door and projects toward the car. The said stud or roller passes between two parallels 13 and 14 (see Figs. 7 to 15 inclusive) which are carried by the car and which normally stand in the position shown in Figs. 1, 7, 10 and 13. These parallels are adapted to be moved up against the roller or stud 17 (see Figs. 9, 12 and 15) which unlatches the door when the parallel 13 strikes the pin 16$^a$ on said latch. The movement of the parallels is peculiar in that, first, the parallel 14 is moved up against the stud or roller 17 to the position shown in Figs. 8, 11 and 14, and then the other parallel 13 acts to operate on the latch to unlock the door and to move against the stud or roller 17 in the manner to be more particularly described hereinafter. The parallels 13 and 14 are then moved bodily to the right carrying the door with them and vice versa to close it. The parallels are joined and held parallel by links 56 pivoted to them so that the action is like a parallel ruler. The parallel 14 is supported upon a truck 22 on the same track 57 which supports the door on the car if there be one, and said parallel 14 also carries a guide 58 which slides underneath a rail or track 59. The parallel 14 and hence parallel 13, is held vertical by the top and bottom link systems 19, 20 and 21 of which link 19 is fixed to a shaft 18 carried by the car. Fixed to parallel 14 is a slotted connecting lever guide 23 shown in detail in Figs. 7 to 15 inclusive, and fixed to parallel 13 is a second slotted connecting lever guide 24 of slightly different contour, at least in so far as its lower end is concerned as shown more particularly in Figs. 7, 8 and 9. The connecting lever 25 is fixed to a sprocket wheel 28 whose axis of rotation is at 60 and has a pin 61 carrying a roller 62 which projects through the slots of and stands at the bottom of both guides as shown. The said connecting lever 25 moves around its axis 60 through an arc of 180° in opening and closing the door, but it also has an excess of movement above said 180° which is resorted to for the purpose of acting on the parallels mainly for the purpose of unlatching and latching the door. When sprocket wheel 28 is rotated in the direction of the arrow Fig. 1, the roller 62 moves the parallel 13 to the position shown in Fig. 9 which acts to operate the latch 16 and open the door, said parallel moving against stop roller 17. The guide 23 is of such shape that it moves parallel 14 up against the stop roller 17 before the parallel 13 strikes it as shown in Figs. 8 and 14. By that time the connecting lever 25 has about become horizontal and the two guides 23 and 24 have the main parallel portions of their slots in registry, as shown in Figs. 9, 12 and 15, so that as lever 25 continues to rotate on its axis 60 both of the parallels 13 and 14 are held against stud 17. Sprocket wheel 28 makes a little over half a revolution or until roller 62 reaches the bottom of the slot again so that the door is fully opened. This movement of the sprocket wheel gives the 180° movement to the connecting lever and the excess above said movement. Rotation of sprocket wheel 28 backwardly then shuts and latches the door and restores the parts to the normal position shown in Fig. 1. The parallels 13 and 14 are made of sufficient length so that the door may be started to open before the car arrives even with the floor and so that the car may start away from the floor before the door is entirely shut. So long as the stud 17 is anywhere between the parallels 13 and 14, the door is movable by the mechanism on the car, whether or not the car is moving.

In Patent #937,696 is shown a construction of door opener similar in some respects to the present one but in that patent there is a constantly rotating shaft extending the full height of the elevator well with operating mechanism for the landing doors located at each floor. This is a very expensive installation and renders it necessary to duplicate the mechanism for every floor. In the present invention this is not necessary, as the fixed stud 17 and pin 16ª on the latch and deflectors or cams at each landing are all that is necessary. The deflectors or cams will be described more fully hereinafter. The operating mechanism in the preferred form of the invention is carried by the car and the car carries it to each floor and puts it in connection with each door to be operated.

The motor M (see Figs. 1, 2 and 3) may be an electric motor mounted on the car for the purpose of constantly driving a horizontal shaft 1. On said shaft are fixed a pair of friction cones 32, 32' and two friction wheels 4 and 4ª. Bearings 36 and 64 are provided which are rockable on pivots 34 and 35 and carry short shafts upon which are fixed friction cones 33' and 33 and the friction wheels 3 and 3ª. (See also detail Fig. 37.) A friction wheel 2 is provided, and if this is bodily moved to the left from its position in Fig. 1 and jammed in between cones 32' and 33' and held there, it will rock bearing 64 so that the friction wheel 3 will be forced against wheel 4, and both cones will be driven by shaft 1 and will rotate wheel 2 in the direction of the arrow, Fig. 1, to open the door. Wheel 2 has a cut-away portion 2ª (see detail Fig. 34) which, in the normal position of the parts, as shown in Fig. 1, normally stands between the friction wheels 32 and 33 so that the friction wheel 2 or the said wheels 32, 33 will not be worn away. If any portion of the wheel 2 except the cut-away 2ª is forced in between the wheels 32 and 33, the said wheels will similarly drive wheel 2 but in the opposite direction to close the door. Wheel 2 is splined to a short shaft 6, mounted in a rock arm 7 having a bearing 5, as fully shown in Figs. 16, 17, 18 and 33–36. This arm 7 rocks on a short shaft 10 fixed in the stationary frame 8, and as it is rocked to the left, it carries the friction wheel 2 bodily to the left between wheels 32' and 33' and vice versa.

The means for rocking the arm 7 comprise a lever 11 which is pivoted to a short arm 7ª of arm 7 and is normally pulled to the left by spring 66 as shown in Fig. 16. A lug 65 on the spring lever 11 normally rests against the arm 7 so that the friction wheel 2 is held to the right as shown in Fig. 1 and Fig. 33. If the lower end of lever 11 is moved to the right far enough to remove the lug 65 from contact with the arm 7 to the position shown in Fig. 18, the fulcrum of lever 11 is changed from the lug to the point at which said lever bears upon its prime mover at its lower end, and the force of the spring 66 will move rock arm 7 and friction wheel 2 to the left. The intermediate position of spring lever 11 as shown in Fig. 17 will be described later.

Fixed to the shaft 6 on which the friction wheel 2 is mounted is a sprocket wheel 9 (see Figs. 1, 2, 3, 35 and 36), over which passes a link belt 67 for transmitting the power to the sprocket wheel 28 to which the connecting lever 25 is secured. Idlers 46 and 46' adjustably mounted in the frame 8 may be provided to take up slack. The connecting lever 25 is secured directly to sprocket wheel 27 if doors only on one side of the elevator shaft are to be operated.

For controlling the power transmitting mechanism and for throwing the spring lever 11 to the right, the following mechanism is employed: The button pressure equalizer 12, Figs. 16, 17 and 18, is mounted on the frame 8 so that it may be rocked on the same shaft 60 on which sprocket wheel 28 is mounted. It carries a roller 80 which is normally located as shown in Fig. 16. It is here shown as against the lower end or shoe of the lever 11. The fork end 81 (see Fig. 21) of link 30 embraces the lever 11 and the roller 80, and is pivoted to the equalizer 12 at 12' so that when the link is moved to the right it forces the roller 80 against the inclined face 82 of lever 11 and moves it against the force of spring 66 to the position shown in Fig. 17. As the tension of the spring 66 increases, more force would have to be applied to the link 30 and to the foot-button or manual device 117 which operates it. The lever 11 is therefore further cut-away or inclined at 83 so as to more nearly equalize the pressure necessary to move the lever its full extent. To the other end of link 30 is pivoted a bell-crank 110 to which is pivoted a link or rod 111 which is pivoted to a bell-crank 112. The bell-crank 112 has a roller 113 which is adapted to travel along a deflector or cam 114, fixed one at each elevator landing. Crank 112 is hung on a pivot shaft 115, which is carried by bell-cranks 116, 116, that are mounted on a pivot-shaft 118 journaled below the floor of the car, and may be rocked by a foot button or manually operated device 117. The action of the parts from link 30 on will be described more fully in connection with other forms of the invention, but in the form of the invention in which a landing door is operated automatically at each floor (if desired) the power transmitting mechanism is controlled in the first place by the manual operation of part 117, as by foot so as to bring roller 113 in line with a deflector or cam 114, and in the second place by the said deflector which, as the car passes along, shifts the bell-crank 112 and causes it to exert a pull on the link or rod 111. By link 30 the equalizer and spring lever are actuated as described in connection with Figs. 4, 5 and 6.

It often happens that an elevator shaft has landing doors on opposite sides which it is desirable to operate, and there is therefore shown in Figs. 4, 5 and 6 a construction by which either or both of such doors may be operated, and there is also shown in dotted lines a door carried by the car and operated in obvious manner from another set of parallels simultaneously with what will be called a "secondary" door. In these figures the same reference characters are used for parts corresponding with parts before described so as to avoid needless repetition. The link 30 has been mentioned in connection with the main form of the invention. A link 30ᵃ now takes the place thereof and has a slotted end 86 in which is located the end of a pivoted bell-crank 84 held in the position shown by spring 85 and in another slot 87 is a similar bell-crank 88. 89 and 90 are links attached to said bell-cranks respectively, and are attached to bell-cranks 27 and 26 shown in Figs. 23, 24 and 25,—26 being indicated by dotted lines. Bell-cranks 27 and 26 are loosely hung on a short shaft 91 and carry rollers 92 and 93 Fig. 4, at their upper ends. The foot-button or manually operated device 48 is attached to a bell-crank 94 fixed on rock shaft 29. When the foot-button is pressed it rocks shaft 91 to the right as shown in Fig. 24, carrying bell-cranks 26 and 27 bodily to the right. A cam or deflector 95 is fixed at the landing floor of the elevator shaft in line with the travel of roller 93. As the car approaches the floor the operator steps on the foot-button throwing both bell-cranks 26 and 27 out, and roller 93 strikes the deflector 95 rocking its bell-crank 27 and pulling down on link 89 which rocks bell-crank 84 Fig. 20, and draws connecting rod 30ᵃ to the right. This rocks the button-pressure-equalizer 12 and forces its roller along the inclines 82 and 83 of the spring lever 11, thus forcing the lower end of said lever to the right until the lug 65 is out of contact with the rock arm 7, the parts being then in the position shown in Fig. 18. Spring 66 then by its pull, rocks arm 7 and forces the friction wheel 2 to the left in between the cones 32' and 33' driving the said wheel, gear 9, link belt or sprocket chain 67, lower sprocket 28ᵃ which opens the door as above described. When the roller 93 runs off of the cam 95 or when the operator takes his foot off the manual pressure device 48, the spring 85 pulls the bell crank 84 backward, thereby releasing the pressure on the lower end of spring lever 11. Spring lever 11 now moves to the left until lug 65 comes in contact with rock arm 7 as shown in Fig. 17, when the spring 66 thereupon, and because of the change of fulcrum, rocks arm 7 to the right forcing wheel 2 in between cones 32 and 33 which rotate wheel 2 in the opposite direction thus closing the door. The parts just described will then be in the position shown in Fig. 16. Because of the movement of connecting lever 25 around an axis, the door moves slowly at first increasing in speed until said lever is vertical, and then decreases in speed until the door comes to rest. If a secondary door is to be operated a cam 95ᵃ acts on roller 92. There is mounted on the shaft 60 and alongside sprocket wheel 28ᵃ corresponding mainly with sprocket wheel 28, a disk 31 which carries the connecting lever 25 instead of sprocket wheel 28 as in the form of the invention previously described. Means are provided for clutching the motion transmitting wheel 28ᵃ to either the disk 31 or to a sprocket wheel 49 as shown in Figs. 29, 30, 31 and 32. A clutch yoke 50 (see also Fig. 38) has a ring shaped central portion loosely embracing the hub 31ᵃ of disk 31 and pivoted to it at 70 so that it can be rocked thereon. The heads 72 and 73 of said clutch yoke are located and move in slots or recesses 76 and 75 respectively in disk 31. A locking pin 77 slidable in the rounded portion of slot 76 is shown in position in Fig. 29 to lock disk 31 to wheel 28ᵃ to operate the former only, but not to operate the sprocket-wheel 49 for driving the mechanism of the secondary door which is some other door in addition to the door operated by the parts described in relation to Figs. 1, 2 and 3. The secondary door 55ª which is indicated in Figs. 5 and 6 by dotted lines may be operated by providing another disk 31ª similar to disk 31 but at the opposite side of the car (see Figs. 4 and 5) which disk may be mounted on a short shaft 31ᵇ. Said disk is adapted to act upon another set of parallels 13ª not only to operate the said secondary door but a car door 55ᵇ having a projection 55ᶜ extending between said parallels. A chain transmission 31ᶜ communicates motion to said disk 31ª from a transverse shaft 31ᵈ which extends across the car to the sprocket wheel 49ª and carries it, and over which sprocket wheel is trained a motion transmitting chain or belt 49ᵇ, which also passes over aforesaid sprocket wheel 49 forming part of the clutch mechanism.

Referring again to Fig. 30, a yoke 51 has a central portion loosely embracing the hub of sprocket wheel 49 and pivoted to it so that it may be rocked thereon. If the yoke 51 is moved until the edge of its head 101 reaches position 102 it will move locking pin 77 across until it frees the disk 31 from the driving sprocket 28ª and locks secondary sprocket 49 to sprocket 28ª. When the friction wheel 2 then rotates it will drive the secondary door mechanism but not disk 31 and the primary door mechanism. If the yoke 51 is rocked half way, pin 77 will lock both disk 31 and secondary sprocket 49 to driving sprocket 28ª and both doors at the same floor will be opened and closed simultaneously through the medium of mechanism to be described in connection with Figs. 26, 27 and 28. This position is shown in Fig. 31.

Cams 52 and 53, shown in detail in Fig. 32, are mounted to rock upon pivots 8ª in frame 8 and are operated by links 104, 105 connected to bell-cranks 84 and 88 respectively, Figs. 19 to 21. It is obvious that when the primary door deflector 95 causes the bell-crank 27, Figs. 23, 24 and 25, and bell-crank 84 to be rocked, it will throw cam 52 so as to move the parts in Figs. 29, 30 and 31 to the position shown in Fig. 29 so as to operate the primary door only. If a secondary cam or deflector 95ª causes bell-cranks 26 and 88 to be moved, this will throw the cam 53 and lock the secondary sprocket 49 to driving sprocket 28ª freeing disk 31 and operating the secondary door only; (see Fig. 30). The deflectors or cams at the landings, described in connection with the operation of the apparatus shown in Figs. 4, 5 and 6 are also shown in connection with the operation of either a primary or secondary door or both doors simultaneously to be now described.

Figs. 26 and 27 show the arrangement of connections for the manually operated device when doors must be opened on both sides simultaneously at some of the landings. To understand this portion of the modified mechanism for operating doors simultaneously, reference should also be had to the broken view, Fig. 28, showing the arrangement and construction of the deflectors or cams by which doors may be operated either simultaneously or separately. By comparison of the deflectors or cams shown in Fig. 28 with the mechanism described in connection with Figs. 1, 2 and 3 and in connection with Figs. 4, 5 and 6 can be readily understood, which deflector or cam can be employed for controlling the operation of the mechanism in Figs. 1, 2 and 3 where one door only on one side is to be operated, and which deflectors or cams can be used when doors on opposite sides of the elevator well are to be operated separately as in Figs. 4, 5 and 6.

In the modified form of apparatus shown in Figs. 26 and 27, the rod 120 is that which goes to the equalizer such as shown in Figs. 16, 17 and 18, and this is connected with a bell-crank 121, to which is also pivoted a rod 122 which in turn is pivotally connected with a bell-crank 123 forming a part of the manual pressure means and which carries a contact roller 124. The bell-crank 123 and roller 124 correspond to similar parts in Figs. 1, 2 and 3 in which form of apparatus only one door is operated. The said bell-crank 123 is pivotally mounted on a shaft 125 which may be moved forwardly by means of bell-cranks 136 pivoted to the bottom of the car by a pivot-shaft 137, the manual pressure device or foot-button 138 being pivoted to one bell-crank 136 in similar manner to the construction shown in Figs. 23, 24 and 25.

In the form of the invention which is now being described, the clutch shown in Figs. 29, 30 and 31 is operated by rods which take the place of the rods 104, 105 shown in Figs. 4, 5 and 6. To this end a rod 126 is pivotally connected with a cam similar to cam 52 and a rod 131 is pivotally connected to a cam similar to cam 53. The rod 126 is for throwing the clutch to control the primary door only and the rod 131 throws the clutch for controlling only the secondary door. The said rod 126 is pivoted to a bell-crank 127 to which is pivotally connected a rod 128 pivotally connected with a bell-crank 129 on shaft 125 and provided with contact roller 130. The rod 131 for the secondary door is pivotally connected with a bell-crank 132, to which is pivotally connected a rod 133 pivotally connected with bell-crank 134 also hung on shaft 125 and provided with a contact roller 135. There are therefore in this form of the invention three bell-cranks 123, 129 and 134 in connection with the manual pressure device, and when the latter is pressed it is obvious that the lateral movement of the shaft 125 will throw all of the contact rollers on said bell cranks into the path of any deflectors or cams which might be coöperatively arranged in the elevator shaft at the landings. The arrangement of the cams as before stated is shown in Fig. 28. This view extends the height of the sheet of drawings and indicates four landings or floors of the building. The deflector or cam A is employed at each landing for the purpose of acting on the contact roller 124 of bell-crank 123 which acts through rod 120 on the equalizer and on the spring lever such as 11 before described for the purpose of controlling the power transmitter to unlock and open a door or doors. Other deflectors or cams as B, C, are arranged either separately or together at the landings, the arrangement depending upon whether one door or a door at the opposite side of the elevator cage is to be operated or whether both doors are to be operated simultaneously.

At the lower and upper landings indicated in Fig. 28 the deflectors or cams B, C, are shown as of less height than the deflector or cam A, which latter cam controls the power transmitter at all the landings. The height of these deflectors B, C, at said landings is equal, with a view to engaging the rollers 130 and 135 of bell-cranks 129 and 134 so as to properly control the clutch through rods 126 and 131 to throw the parts to the half way position shown in Fig. 31 for controlling the simultaneous opening and closing of the landing doors on opposite sides of the elevator shaft. If at other landings one or the other of the doors on opposite sides of the elevator shaft are to be opened and closed, the appropriate deflectors, or cams B, C, are placed at the landings as shown at the intermediate portions of Fig. 28. That is to say, deflector or cam B is located at the third landing if a primary door only is to be opened, but in this location the said deflector B will be higher than in the case where it is associated with a deflector or cam C. At the second landing no deflector or cam B is shown, but only a deflector C which will control the operation of the opening and closing of a secondary door, and said cam C is likewise higher than it is when associated with deflector or cam B.

It may happen that because of the failure of the motor M, or because the operator for some reason wants to leave the door open after he leaves the floor, or for some other reason he may want to move a door by hand. He could not do it with the parts in the position shown in Figs. 1 and 4 because the connecting lever 25 is below the horizontal, and even if it were not the friction wheel 2 would have been rotated a partial revolution and, as it would be forced in between cones 32 and 33, the motor if running would close the door and if not running would make it very hard to turn over the train of mechanism. Mechanism is therefore provided which is more fully illustrated in Figs. 33, 34 and 35 to free the friction wheel 2 from both sets of friction cones and rotate wheel 28, or wheel 28ᵃ and disk 31, or wheels 28ᵃ and 49, as the case may be, until lever 25 is above the horizontal. The disabling lever 38 accomplishes this. In Fig. 33 the normal position of the disabling lever is shown, in Fig. 34 the first shifted position, and in Fig. 35 the position of the lever when it has been fully actuated and the connecting lever 25 moved beyond dead center. The disabling lever is pivoted to the frame 8 at 106 and normally held in the position shown in Fig. 33 by a spring 107. Pull rod 37 is connected to the outer end of the disabling lever and extends down into the car. The short end 38ᵃ of disabling lever 38 stands just under the short arm of rock arm 7 so that when lever 38 is rocked downwardly the short arm strikes the rock arm 7 at 40, as shown in Fig. 34, and rocks the arm 7 and friction wheel 2 sufficiently to free the latter from both sets of cones. The disabling lever 38 when it is brought to the position shown in Fig. 34 also strikes a lug 39 on the friction wheel 2 and rotates the wheel sufficiently to raise the lever 25 above the horizontal as shown in Fig. 35. The door may then be moved either way by hand. If the operator wants to leave the door open he goes on and, if the motor is running, the release of the pull rod 37 will release the wheel 2 and allow it to be again forced in between cones 32 and 33, when, by the action of power spring 66, the parts will be automatically restored to the position shown ready for a new operation. It is calculated that the spring 107 will be no more than strong enough to hold up the weight of the disabling lever, pull rod 37, etc. and that the friction of the disabling lever against the short arm or lug of rock arm 7 will be sufficient to prevent the disabling lever being raised by its spring unaided. The main power spring 66 will be quite powerful and there will be considerable friction at the point indicated. There is an extension 109 on the outer end of the disabling lever which is intended to engage a lug 108, located on the wheel 2 diametrically opposite the lug 39, when the friction wheel 2 is rotated to the right in opening a door so far that the connecting lever is moved to horizontal, and which will rotate the wheel 2 to the left far enough to get the connecting lever 25 off dead center so that the door may be closed by hand.

In order to move the parallels 23, 24 back without also moving the door, the car should be placed mid-way between two landings; as, in order to secure the greatest possible time in which to close a door, should the car be started away from the landing before the manually operated device is released, the parallels should be as long as possible. They may and preferably will be but slightly shorter than the distance between the latches of the two adjacent landing doors that are nearest together. When the car is even with the landing, the abutment 17 above the latch on the door should be mid-way between the ends of the parallels.

It is obvious that this invention is susceptible of various modifications, as parts may be added, parts omitted, and parts rearranged and modified, without departing from the spirit and scope of the invention.

What I claim is:

1. In a door operating mechanism, the combination of an elevator car, a motor and pivoted lever rotated thereby carried on the car, a landing door at a floor, and means connecting said lever to said door when the car is adjacent the door to open the same, comprising parallels carried by the car and engaging said door as the car approaches the floor and laterally moved by said lever.

2. In a door operating mechanism, the combination of an elevator car, a constantly running motor carried thereby, a landing door in an elevator shaft at a floor passed by said car, door operating means carried by the car and normally unconnected with said motor, and mechanism under the control of the operator for connecting said motor to said door operating means and the latter to the door for opening the same.

3. In a door operating mechanism, the combination of an elevator car, a motor thereon, a landing door at a floor, parallels carried by the car and directly engaging said door to move the same, and means for connecting said motor to said parallels at will and adapted to move said parallels laterally.

4. In a door operating mechanism, the combination of an elevator car, a motor and a power transmitter thereon, means for connecting said motor and transmitter at will, a landing door, a latch carried on said door, engaging means operated from said transmitter for engaging and operating said latch to unlock or lock said door, and additional means on said door, engaged by said engaging means, for opening or closing said door by said engaging means when the latter is not operating said latch.

5. In a door operating mechanism, the combination of a door, latching means therefor, contractile means for coöperating with said latching means to unlock or lock said door, and a power transmitter for actuating said contractile means when contracted to open or close said door.

6. In a door operating mechanism, the combination of a door, relatively movable parallels, and means for shifting said parallels laterally for engaging a part of said door to open or close said door.

7. In a door operating mechanism, the combination of an elevator car, a power transmitter thereon, a door, and contractile parallels carried by said car and operated by said power transmitter for controlling said door.

8. In a door operating mechanism, the combination of an elevator car, a power transmitter thereon, a door, a latch for said door, and contractile parallels carried by said car and operated by said power transmitter for operating the door-latch to unlock or lock the door and for operating the door to open or close it.

9. In a door operating mechanism, the combination of a door, relatively movable parallels for engaging a part of said door to open or close said door, and means for maintaining the parallelism of said parallels.

10. In a door operating mechanism, the combination of a door, relatively movable parallels for engaging a part of said door to open or close said door, means for maintaining the parallelism of said parallels, and means for guiding said parallels transversely.

11. In a door operating mechanism, the combination of a door, relatively movable parallels for engaging a part of said door to open or close said door, means for maintaining the parallelism of said parallels, and means for connecting the ends of said parallels and adapted to secure equal movements of the said ends.

12. In a door operating mechanism, the combination of a door, relatively movable parallels for engaging a part of said door to open or close said door, means for maintaining the parallelism of said parallels, and pivoted link-devices for connecting both ends of said parallels and adapted to secure equal movements of both ends.

13. In a door operating mechanism, the combination of a door, a latch therefor, door controlling parallels, means for supporting the parallels, and means for moving said parallels to or from each other to act on said latch, and for moving the parallels bodily in a lateral direction to open said door.

14. In a door operating mechanism, the combination of an elevator car, normally open door controlling parallels supported by said car, and means for moving said parallels nearer together out of their said open position, or away from each other out of closed position, and also bodily together in a lateral direction.

15. In a door operating mechanism, the combination of an elevator car, normally open door controlling parallels supported by said car, means for moving said parallels nearer together out of their said open position, or away from each other out of closed position, and also bodily together in a lateral direction, and a landing door provided with means for engagement between and by said parallels.

16. In a door operating mechanism, the combination of an elevator car, normally open door controlling parallels supported by said car, means for moving said parallels nearer together out of their said open position, or away from each other out of closed position, and also bodily together in a lateral direction, and a landing door, a door latch for engagement between and by said parallels, and with additional means for engagement between and by said parallels for opening or closing said door during their said bodily lateral movement.

17. In a door operating mechanism, the combination of an elevator car, inactively separated door controlling parallels supported by said car, means for moving said parallels nearer together out of their inactive position, or away from each other out of active position, and also bodily together in a lateral direction, said means comprising mechanism for moving first one parallel—the first—toward the second, and thereafter, the second toward the first, and a landing door provided with means for the first engagement of said first parallel and for the second engagement of the second parallel.

18. In a door operating mechanism, the combination of an elevator car, inactively separated door controlling parallels supported by said car, means for moving said parallels nearer together out of their inactive position, or away from each other out of active position, and also bodily together in a lateral direction, said means comprising mechanism for moving first one parallel—the first—toward the second, and, thereafter, the second toward the first, a landing door, and a latch and a separate abutment on said door, said first parallel first engaging said abutment, and said second parallel then engaging said latch.

19. In a door operating mechanism, the combination of relatively movable door-controlling parallels, a door, door locking means which may be engaged between said paralells, guides on said parallels provided with camming portions, a connector operating on said guides and causing the unlocking or locking of said door and its opening or closing, and a power transmitter for operating said connector through a path of movement in excess of its door-opening or closing movement, the said excess movement serving, through the medium of said camming portions, to unlock or lock said door, and the said door opening or closing movement of said connector causing the engagement of said parallels with a part of said door.

20. In a door operating mechanism, the combination of relatively movable door-controlling parallels, a door, door locking means which may be engaged between said parallels, guides on said parallels, a connector operating on said guides and causing the unlocking or locking of said door and its opening or closing, and a power transmitter for operating said connector through an arc of 180° and an excess thereof, the an arc of 180° and an excess thereof, the said excess movement serving to unlock or lock said door, and the said 180° movement of said connector causing the engagement of said parallels with a part of said door.

21. In a door operating mechanism, the combination of a door, a door latch, pivotally mounted door operating lever, means for swinging the same in one or the other direction in an arc somewhat greater than 180°, means for operating on said latch, said greater movement of said lever placing said means in condition to operate said latch, and power mechanism for acting on said swinging means.

22. In a door operating mechanism, the combination of an oscillatory door-operating lever, a wheel rotatable in either direction through a given arc of a circle, means for transmitting motion from said wheel to said lever and for causing said lever to move through a greater arc and relatively movable door operating parallels operated by said lever.

23. In a door operating mechanism, the combination of a laterally movable wheel, means for turning said wheel in either of two directions according as the wheel is moved to one side or the other, motion transmitting means operable by said wheel, and a door-operating lever movable by said motion transmitting means through an arc greater than 180°.

24. In a door operating mechanism, the combination of an oscillatory support, a wheel journaled thereon, means arranged to coöperate with the rim of said wheel for turning it in either of two directions according to the position of said support, motion transmitting means operable by said wheel, and a door-operating lever movable by said motion-transmitting means.

25. In a door operating mechanism, the combination of an oscillatory support, a wheel journaled thereon, means located at opposite sides of said wheel for turning it in either of two directions, means for oscillating said support and shifting said wheel to either of said turning means, motion-transmitting means operable by said wheel, and a door-operating lever movable by said motion-transmitting means through an arc greater than 180°.

26. In a door-operating mechanism, the combination of a pivotally supported wheel, means for turning said wheel in either of two directions, motion-transmitting means operable by said wheel, a door-operating lever movable by said power-transmitting means through an arc greater than 180°, a door, door latch, relatively movable parallels for engaging the door latch to unlock or lock said door, and means connecting said lever with said parallels, whereby said latch is controlled by the excess of movement of said lever over 180°, and whereby the movement of 180° of said lever acts on said parallels to open or close said door.

27. In a door-operating mechanism, the combination of an elevator car, an oscillatory door-operating lever or connector carried thereby, power means on said car for moving said lever through an arc greater than 180°, a door, and contractile parallels carried by said car and operated by said lever or connector for operating, first, the door-latch to unlock or lock the door and, second, the door to open or close it.

28. In a door-operating mechanism, the combination of an elevator car, power means thereon, comprising a drive-shaft and drivers, a power-transmitting member between said drivers, means for moving said member into driven engagement with one or the other of said drivers, an oscillatory door-operating lever or connector carried by said car, motion-transmitting means between said member and said lever for amplifying the movement of said lever as compared with the movement of said member, a door, a latch therefor, and means for connecting said lever with said door to open or close it, said means comprising devices for causing the amplified movement of said lever to act on said latch to unlock or lock said door.

29. In a door operating mechanism, the combination of an elevator car, power means thereon, comprising a drive-shaft and drivers, a power-transmitting member between said drivers, means for moving said member into driven engagement with one or the other of said drivers, an oscillatory door-operating lever operated by said member, a landing door, and means carried by the car for connecting said lever to said door to operate it.

30. In a door-operating mechanism, the combination of an elevator car, power means thereon, comprising a drive-shaft and drivers, a power-transmitting member between said drivers, means for moving said member into driven engagement with one or the other of said drivers, an oscillatory door-operating lever operated by said member, a landing door, a latch therefor, and means carried by the car for connecting said lever with said door to open or close it, said means comprising devices acting to operate said latch to unlock or lock said door.

31. In a door-operating mechanism, the combination of drivers, an oscillatory pivoted support between said drivers, a power-transmitting member mounted on said support, means for moving said member into driven engagement with one or the other of said drivers, a door, and means operated by said member for opening or closing said door.

32. In a door-operating mechanism, the combination of drivers, a shiftable support, a power-transmitting member on said support, a manually operable device, and a pressure equalizer actuated by said device, to act to shift said support and engage said member with one of said drivers, and to equalize the pressure necessary to shift said support.

33. In a door-operating mechanism, the combination of a power-transmitting member to be shifted to enable it to change its direction of movement, a manually operable device, and a pressure equalizer actuated by said device to act to shift said member and to equalize the pressure necessary to shift it.

34. In a door-operating mechanism, the combination of an oscillatory pivoted support, a power-transmitting member mounted on said support, to be shifted therewith when its direction of movement is to be changed, separate devices for operating said power transmitting mechanism in two directions, a tensioned lever adapted to act on said support, a manually operable device, and means for operating said lever from said manual device to shift said support laterally on its pivot.

35. In a door-operating mechanism, the combination of an oscillatory pivoted support, a power-transmitting member mounted on said support, to be shifted therewith when its direction of movement is to be changed, a tensioned lever pivoted to said support, said support having an abutment for said lever, a manually operable device, and means for operating said lever from said manual device to shift said support laterally on its pivot.

36. In a door-operating mechanism, the combination of an oscillatory support, a power-transmitting member mounted on said support, to be shifted therewith when its direction of movement is to be changed, a tensioned lever pivoted to said support, a manual pressure equalizer acting on said lever, a manually operable device, and connecting links between said manually operable device and said equalizer.

37. In a door-operating mechanism, the combination of an oscillatory support, a power-transmitting member mounted on said support, to be shifted therewith when its direction of movement is to be changed, a tensioned lever pivoted to said support and having inclined contact faces, a manual-pressure equalizer acting on said faces of said lever, a manually operable device, and means connecting said manually operable device and said equalizer.

38. In a door-operating mechanism, the combination of an elevator car, a power-transmitter thereon provided with door-operating means, manually operable means mounted on said car and comprising relatively movable members and a device in common therewith for simultaneously moving them, one of said members being movable independently of the other, and means for controlling the action of said power-transmitter from said independently movable member.

39. In a door-operating mechanism, the combination of an elevator car, a power transmitter thereon provided with door-operating means, manually operable means mounted on said car and comprising a bell crank pivotally supported on said car, a bell crank pivoted to the aforesaid bell-crank and constituting an independently movable member, and means for controlling the action of said power transmitter from said independently movable member.

40. In a door-operating mechanism, the combination of an elevator car, a deflector fixed in the elevator shaft, a power transmitter on said car provided with door-operating means, manually operable means mounted on said car and comprising relatively movable members, one of said members constituting a device for throwing the other or independently movable member into position to be struck by said deflector as said car moves, and means for controlling the action of said power transmitter through the actuation of said independently movable member by said deflector.

41. In a door-operating mechanism, the combination of an elevator car, a power transmitter thereon provided with door-operating means, manually operable means mounted on said car and comprising relatively movable members, one of said members being movable independently of the other, and means for controlling the action of said power transmitter from said independently movable member, said controlling means including a manual-pressure equalizer.

42. In a door-operating mechanism, the combination of an elevator car, a deflector fixed in the elevator shaft, a power transmitter on said car provided with door-operating means, manually operable means mounted on said car and comprising relatively movable members, one of said members constituting a device for throwing the other or independently movable member into position to be struck by said deflector as said car moves, and means for controlling the action of said power-transmitter through the actuation of said independently movable member by said deflector, said controlling means including a manual-pressure equalizer.

43. In a door-operating mechanism, the combination of an elevator car, a motor thereon, a landing, a door at said landing on each of two sides of the car, and means for connecting said motor to either door or both as desired.

44. In a door-operating mechanism, the combination of an elevator car, a motor thereon, a landing, a door at said landing on each of two sides of the car, and means for connecting said motor to either door or both as desired, and including a deflector in the shaft for each door, and means operable by the operator for causing said deflectors to control the desired door-opening.

45. In a door-operating mechanism, the combination with an elevator car, of primary and secondary landing doors stationarily located in an elevator shaft controlling passage to or from said car, a power-transmitter mounted on said car and normally unconnected with either door, and means for controlling the operation of said transmitter on said doors selectively.

46. In a door-operating mechanism, the combination with an elevator car, of primary and secondary landing doors stationarily located in an elevator shaft controlling passage to or from said car, a power transmitter mounted on said car and normally unconnected with either door, a door on said car, and means for controlling the operation of said transmitter on said doors selectively.

47. In a door-operating mechanism, the combination with an elevator car, of primary and secondary doors controlling passage to or from said car, a power transmitter, deflectors in the elevator shaft, and means for controlling the operation of said transmitter on said doors selectively through the medium of said deflectors.

48. In a door-operating mechanism, the combination with a car, of primary and secondary doors controlling the passage to or from said car, a power transmitter, means for controlling the operation of said transmitter on said doors selectively, and means for controlling the operation of said transmitter on said doors simultaneously.

49. In a door-operating mechanism, the combination with an elevator car, of primary and secondary landing doors controlling the passage to or from said car, a power transmitter mounted on said car, means for controlling the operation of said transmitter on said doors selectively, and means for controlling the operation of said transmitter on said doors simultaneously.

50. In a door-operating mechanism, the combination with an elevator car, of primary and secondary doors controlling the passage to or from said car, a power-transmitter, deflectors in the elevator shaft, means for controlling the operation of said transmitter on said doors selectively, and means for controlling the operation of said transmitter on said doors simultaneously, said controlling means being actuated through the medium of said deflectors.

51. In a door-operating mechanism, the combination with an elevator car, of primary and secondary doors controlling the passage to or from said car, a power transmitter on said doors selectively, and means for controlling the operation of said transmitter on said doors selectively, and means for controlling the operation of said transmitter on said doors simultaneously, said controlling means being actuated through the medium of said deflectors, and one of said deflectors being higher than its companion or companions.

52. In a door-operating mechanism, the combination with an elevator car, of primary and secondary doors stationarily located in an elevator shaft controlling the passage to or from said car, a power-transmitter adapted to operate either door and normally unconnected with either door, a clutch for causing the said transmitter to act on either door, and means for controlling the operation of said clutch according to the door selected to be operated.

53. In a door-operating mechanism, the combination with a car, of stationarily located primary and secondary doors controlling the passage to or from said car, a power-transmitter adapted to operate either door and normally unconnected with either door, a clutch for causing the said transmitter to act on either door, means for controlling the operation of said clutch according to the door selected to be operated, and manually operable means, said manually operable means being adapted to shift the position of parts of said controlling means, relatively to actuating parts thereof.

54. In a door-operating mechanism, the combination with a car, of primary and secondary doors controlling the passage to or from said car, a power-transmitter adapted to operate either door, a clutch for causing the said transmitter to act on either door, and provided with means for causing the said transmitter to act on said doors simultaneously, and means for controlling the operation of said clutch according to the door selected to be operated, or according to whether both doors are to be simultaneously operated.

55. In a door-operating mechanism, the combination with an elevator car, of primary and secondary landing doors stationarily located in an elevator shaft controlling the passage to or from said car, a power-transmitter adapted to operate either door, and mounted on said car but normally unconnected with either door, a clutch for causing the said transmitter to act on either door, and means for controlling the operation of said clutch according to the door selected to be operated.

56. In a door-operating mechanism, the combination with an elevator car, of primary and secondary landing doors controlling the passage to or from said car, a power-transmitter adapted to operate either door, and mounted on said car, a clutch for causing the said transmitter to act on either door, means for controlling the operation of said clutch according to the door selected to be operated, and deflectors in the elevator shaft serving to actuate said clutch controlling means.

57. In a door-operating mechanism, the combination with an elevator car, of primary and secondary landing doors controlling the passage to or from said car, a power-transmitter adapted to operate either door, and mounted on said car, a clutch for causing the said transmitter to act on either door, means for controlling the operation of said clutch according to the door selected to be operated, deflectors in the elevator shaft serving to actuate said clutch controlling means, and manually operable means serving to move said means actuated by said deflectors into position for such actuation.

58. In a door-operating mechanism, the combination of a door, a door latch shiftable and rotary power-transmitting member, a door-operating arm movable through an arc in excess of 180°, and operated by said member, means for operating on said latch, said excess movement of said arm putting said means in condition to operate said latch, and disabling means for shifting said member and for also causing motion of said arm past dead center, through partial rotation of said transmitting member.

59. In a door-operating mechanism, the combination of a shiftable and rotary power transmitting member, a door-operating arm, a support separate from said member and on which said arm is movably mounted, and disabling means for shifting said member and for also causing motion of said arm past dead center, through partial rotation of said transmitting member.

60. In a door-operating mechanism, the combination of a shiftable and rotary power-transmitting member, a door-operating arm, a support separate from said member and on which said arm is movably mounted, means for moving said arm from said member at relatively greater speed, and disabling means for shifting said member and for also causing motion of said arm past dead center, through partial rotation of said transmitting member.

61. In a door-operating mechanism, the combination of an elevator car, a shiftable and rotary power transmitting member thereon, a door-operating arm, a support separate from said member and on which said arm is movably mounted, and disabling means mounted on said car for shifting said member and for also causing motion of said arm past dead center, through partial rotation of said transmitting member.

62. In a door-operating mechanism, the combination of an oscillatory pivoted support, a rotatory power-transmitting member provided with an abutment, a door-operating arm operated by said member, and disabling means for shifting said support on its pivot and adapted to strike said abutment to cause partial rotation of said member and the movement of said arm past dead center.

63. In a door-operating mechanism, the combination of an oscillatory pivoted spring tensioned support, a rotatory power transmitting member provided with an abutment, a door-operating arm operated by said member, and disabling means to frictionally engage said support for shifting it on its pivot, and adapted to strike said abutment to cause partial rotation of said member and the movement of said arm past dead center.

64. In a door-operating mechanism, the combination of a shiftable and rotary power-transmitting member, a door-operating arm operated by said member, and disabling means for shifting said member and for also causing motion of said arm past dead center through partial rotation of said transmitting member, said disabling means comprising two abutments on said member, one of which is adapted to be engaged to move said member and the other of which serves to limit the rotatory movement of said member.

65. In a door-operating mechanism, the combination of a shiftable and rotary power-transmitting member, a door-operating arm operated by said member, and disabling means for shifting said member and for also causing motion of said arm past dead center through partial rotation of said transmitting member, said disabling means comprising two abutments on said member, and an operating lever, one of which abutments is adapted to be engaged by said lever to move said member in one direction and the other of which is adapted to move said member in the opposite direction and in both cases to move said arm past dead center.

66. In combination, a car, a constantly acting source of power thereon, a door, positively acting door-coupling means comprising inter-engaging devices carried by said car and operable from said source of power, said coupling means being normally disconnected from said source of power, and means for connecting said coupling means with said source of power to open and close said door at will.

67. In combination, a car, a constantly acting source of power thereon, a door, door latching means, and means provided with a member movable parallel with said door for connecting said latching means and door with said source of power at will.

68. In combination, an elevator car, a constantly acting source of power thereon, a door stationarily mounted in the elevator shaft and passed by said car, the said source of power and the door being normally disconnected, means for connecting said door with said source of power for the operation of said door, and means for controlling the operation of said connecting means to open and close said door at will while said source of power is constantly acting.

69. In combination, an elevator car, a constantly acting source of power thereon, a door stationarily mounted in the elevator shaft and passed by said car, the said source of power and the door being normally disconnected, means for connecting said door with said source of power for the operation of said door, and means for controlling the operation of said connecting means to open and close said door at will while said source of power is constantly acting, said source of power being independent of said controlling means.

70. In combination, a car, a constantly acting source of power thereon, a landing, a door at said landing on each of two sides of said car, and means for connecting said constantly acting source of power to either door or both as desired.

71. In combination, a car, a constantly acting source of power thereon, a door on each of two sides of said car, and means for connecting said constantly acting source of power to either door or both as desired.

72. In a door operating mechanism, the combination of a car, a constantly acting source of power carried thereby, door-operating means carried by the car and normally unconnected with said source of power, and mechanism under the control of the operator for connecting said source of power to said door-operating means and the latter to the door for operating the said door.

73. In combination, an elevator car, a constantly acting source of power thereon, a door at each of two sides, of the car and mounted in the elevator shaft so as to be passed by the car, and means for connecting said constantly acting source of power to either door as desired.

74. In combination, an elevator car, a constantly acting source of power thereon, a door mounted in the elevator shaft so as to be passed by the car, a shiftable member adapted to be driven by said source of power and operable by said source of power to adapt it to move said door in one direction, and means for shifting said driven member into coöperative relationship with said source of power to enable the latter to reverse the direction of movement of said driven member and to move said door in another direction.

75. In combination, a car, a constantly acting source of power thereon, a door, means for connecting said door with said source of power, actuating means mounted in the path of movement of said car, and means for controlling the movement of said connecting means by said source of power and actuated partly by the car operator, and partly by said actuating means.

76. In combination, a car, a shaft in which the car moves, a constantly acting source of power on the car, a door, means for connecting said door with said source of power, and means a part of which is carried by the car and operable by the operator and another part of which is located in the shaft and adapted to coöperate therewith for connecting said connecting means with said source of power.

77. In combination, a car, a constantly acting source of power thereon, a door, means for connecting said door with said source of power, a member supported independently of said car, and means for controlling the operation of said connecting means by said source of power and actuated partly but not entirely by said independent member and partly actuated by the car operator, said controlling means comprising a movable contact member coöperating with said independent member, and a manually operated device in the car.

78. In combination, a car, a constantly acting source of power thereon, a door, means adapted to be connected automatically with said source of power, and means operated thereby and adapted to be connected with said door, whereby said door is moved at a slower speed at one end of its travel.

79. In combination, a car, a motor thereon, a door at a landing, a single door-engaging device adapted to move said door in both directions, and means for moving said door-engaging device in both directions by said motor without releasing the door or stopping the motor.

80. In combination, a car, a motor thereon, a door at a landing, and means for moving said door in both directions by said motor without stopping the motor, including a part in the shaft and a part carried by the car and under control of the operator, said parts adapted to coöperate to connect the door with the motor for operation thereby.

81. In combination, a car, a motor thereon, a door commanding entrance to the car, a single door-engaging device adapted to move said door in both directions, and means for moving said door-engaging device in both directions, without releasing said door, through the running of said motor in one direction.

82. In combination, a car, a door at a landing, a motor on said car and which runs in one direction only during the time when said car is opposite said door, and means for maintaining a constant connection at said time between said motor and said door for both opening and closing it.

83. In a door operating mechanism, the combination of a car, a constantly running motor carried thereby, a landing door at a floor, door operating means carried by the car and normally unconnected with said motor, and mechanism under the control of the operator for connecting said motor to said door operating means and the latter to the door for opening the same.

84. In a door-operating mechanism, the combination with a car, of primary and secondary landing doors controlling passage to or from said car, a power-transmitter mounted on said car, and means for controlling the operation of said transmitter on said doors selectively.

85. In a door-operating mechanism, the combination with a car, of primary and secondary landing doors controlling passage to or from said car, a power transmitter mounted on said car, a door on said car, and means for controlling the operation of said transmitter on said doors selectively.

86. In a door-operating mechanism, the combination with a car, of primary and secondary doors controlling the passage to or from said car, a power-transmitter adapted to operate either door, a clutch for causing the said transmitter to act on either door, and means for controlling the operation of said clutch according to the door selected to be operated.

87. In a door-operating mechanism, the combination with a car, of primary and secondary doors controlling the passage to or from said car, a power-transmitter adapted to operate either door, a clutch for causing the said transmitter to act on either door, means for controlling the operation of said clutch according to the door selected to be operated, and manually operable means, said manually operable means being adapted to shift the position of parts of said controlling means, relatively to actuating parts thereof.

88. In combination, a car, a constantly acting source of power thereon, a door, both the said source of power and the door being normally disconnected, means for connecting said door with said source of power for the operation of said door, and means for controlling the operation of said connecting means to open and close said door at will while said source of power is constantly acting.

89. In combination, a car, a constantly acting source of power thereon, a door, both the said source of power and the door being normally disconnected, means for connecting said door with said source of power for the operation of said door, and means for controlling the operation of said connecting means to open and close said door at will while said source of power is constantly acting, said source of power being independent of said controlling means.

90. In combination, a car, a constantly acting source of power thereon, a door at each of two sides of the car, and means for connecting said constantly acting source of power to either door as desired.

91. In combination, a car, a constantly acting source of power thereon, a door, a shiftable member adapted to be driven by said source of power and operable by said source of power to adapt it to move said door in one direction, and means for shifting said driven member into coöperative relationship with said source of power to enable the latter to reverse the direction of movement of said driven member and to move said door in another direction.

Signed at Dayton, Ohio this 5 day of August 1911.

FRANCIS K. FASSETT.

Witnesses:
W. B. BIRNEY,
PAUL W. HIRSCH.

It is hereby certified that in Letters Patent No. 1,174,403, granted March 7, 1916, upon the application of Francis K. Fassett, of Dayton, Ohio, for an improvement in "Door-Operating Mechanism," errors appear in the printed specification requiring correction as follows: Page 10, line 29, claim 39, for the words "pivotally supported" read *pivoted;* same page and claim, line 30, for the words "pivoted to" read *pivotally supported on;* page 11, line 20, claim 51, strike out the words "on said doors selectively, and" and insert the commas and words , *deflectors in the elevator shaft,;* same page and claim, lines 19–20, for the word "transmitmitter" read *transmitter;* and that the said Letters Patent should be read with these corrections therein that the same may conform to the record of the case in the Patent Office.

Signed and sealed this 11th day of April, A. D., 1916.

[SEAL.]

Cl. 187—52.

R. F. WHITEHEAD,
*Acting Commissioner of Patents.*